United States Patent [19]

Kay

[11] Patent Number: 5,383,278
[45] Date of Patent: Jan. 24, 1995

[54] WIDE FIELD OF VIEW REFLEX SIGHT FOR A BOW

[76] Inventor: Ira M. Kay, Elway Hall, Rte. 2, Box 70, Warrenton, Va. 22186

[21] Appl. No.: 180,081

[22] Filed: Jan. 11, 1994

Related U.S. Application Data

[63] Continuation-in-part of Ser. No. 34,839, Mar. 19, 1993, which is a continuation-in-part of Ser. No. 3,703, Jan. 13, 1993, abandoned.

[51] Int. Cl.[6] .......................... F41G 1/34; F41G 1/467
[52] U.S. Cl. ...................................... 33/265; 33/241; 124/87
[58] Field of Search .................. 33/241, 265; 356/251, 356/252; 124/87

[56] References Cited

U.S. PATENT DOCUMENTS

| | | |
|---|---|---|
| 1,265,266 | 5/1918 | Simpson . |
| 2,030,312 | 2/1936 | Mossberg . |
| 2,542,501 | 2/1951 | Fredrickson ............................ 33/265 |
| 2,545,454 | 3/1951 | Fredrickson ............................ 33/265 |
| 2,559,927 | 7/1951 | Beloungy ................................ 33/265 |
| 2,596,522 | 5/1952 | Bethke . |
| 2,633,051 | 3/1953 | Davis . |
| 2,642,661 | 6/1953 | Fredrickson ............................ 33/265 |
| 2,780,130 | 2/1957 | Mauer . |
| 3,565,539 | 2/1971 | Russa . |
| 3,766,656 | 10/1973 | Westphal ............................... 33/265 |
| 3,816,005 | 6/1974 | Kirschner . |
| 3,833,799 | 9/1974 | Audet . |
| 3,910,700 | 10/1975 | Sprandel ................................ 33/265 |
| 3,942,901 | 3/1976 | Ekstrand . |
| 3,963,356 | 6/1976 | Wiklund . |
| 4,346,995 | 8/1982 | Morris . |
| 4,402,605 | 9/1983 | Ekstrand . |
| 4,473,959 | 10/1984 | Saltzman .............................. 33/265 |
| 4,481,717 | 11/1984 | Kowalski .............................. 33/265 |
| 4,606,629 | 8/1986 | Hines et al. ........................... 33/265 |
| 4,665,622 | 5/1987 | Idan . |
| 4,713,889 | 12/1987 | Santiago . |
| 4,764,011 | 8/1988 | Goldstein . |
| 4,859,058 | 8/1989 | Ekstrand . |
| 4,945,667 | 8/1990 | Rogalski et al. . |
| 5,090,805 | 2/1992 | Stawarz ................................. 33/241 |
| 5,155,915 | 10/1992 | Repa . |
| 5,205,044 | 4/1993 | DePaoli . |

FOREIGN PATENT DOCUMENTS

WO8002069 2/1980 WIPO .

*Primary Examiner*—Thomas B. Will

[57] ABSTRACT

A sight for aiming an arrow propelled by a bow to a target, comprises a frame; a mounting support secured to the frame for attaching the frame to a bow; a lens holder and lens secured to the frame front end; a light source secured to the frame rear end and adapted to project a light spot onto the lens, the light source and the lens being positioned relative to each other such that the light spot projected onto the lens is reflected to the user's eye who then lines up the light spot onto the target to take aim; a hinge disposed between the lens holder and the frame; a screw-drive operably associated with the ring and the frame and adapted to selectively move the ring about the hinge in first and second opposite directions to change the orientation of the optical axis of the lens relative to the user's line of sight, thereby causing the user to change the attitude of the arrow relative to the horizontal to compensate for various distances to the target; and first and second switches adapted to control the operation of the screw-drive in moving the ring in the first and second opposite directions, respectively.

24 Claims, 4 Drawing Sheets

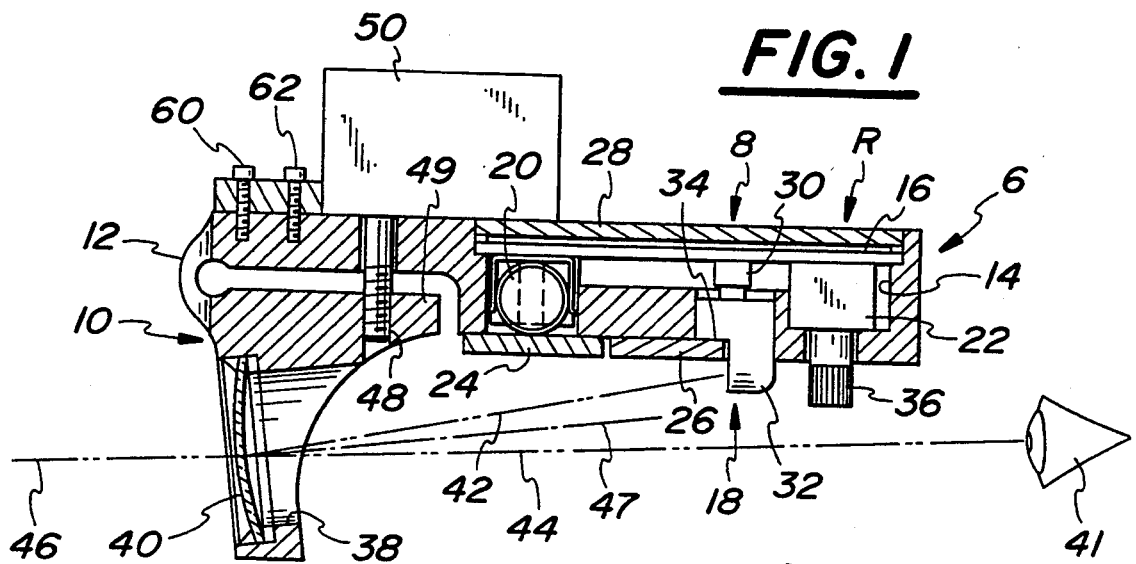
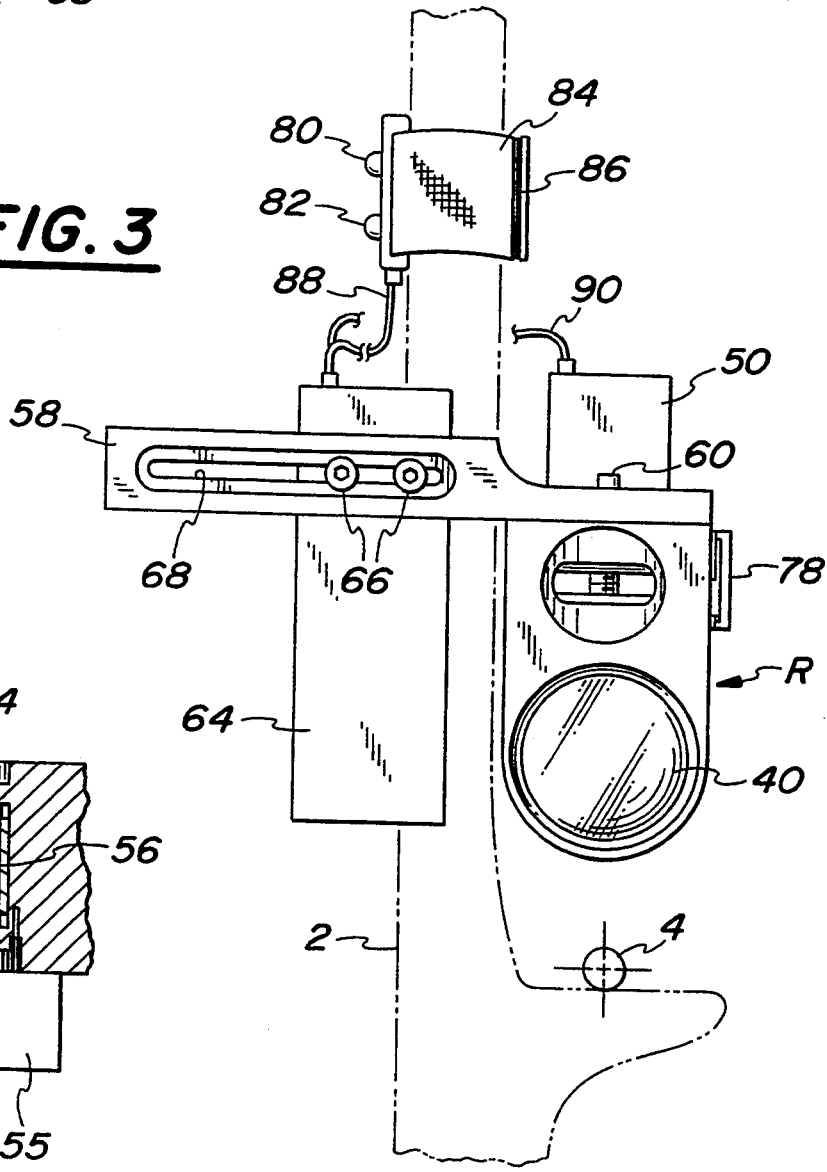
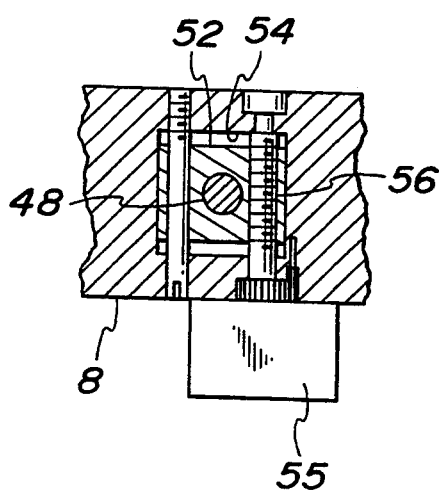

WIDE FIELD OF VIEW REFLEX SIGHT FOR A BOW

RELATED APPLICATIONS

This is a continuation-in-part application of application Ser. No. 08/034,839, filed on Mar. 19, 1993, pending, which is a continuation-in-part application of application Ser. No. 08/003,703, filed on Jan. 13, 1993 now abandoned.

FIELD OF THE INVENTION

The present invention relates generally to a reflex-type sight and particularly to a sight for use in a bow having a wide field of view and touch-button adjustment for range.

BACKGROUND OF THE INVENTION

Reflex-type sights are generally used with guns and primarily use telescope-like type tubes to enclose the optical elements. They project a bright spot of light against a window and the gun is sighted by placing the spot on the target as seen through the window. They are particularly heavy and somewhat cumbersome to use, requiring one to directly look precisely through the sight tube to locate the target to aim the light spot and therefore have relatively restricted fields of view. Additionally, prior art reflex sights used primarily for guns are not adjustable for extreme variations in trajectory associated with such projectiles as arrows and the like.

The present invention solves the above problems and provides other advantages as will be discussed below.

OBJECTS AND SUMMARY OF THE INVENTION

It is an object of the present invention to provide a reflex-type sight for use in a bow that has a wide field of view and relatively lightweight for ease of operation.

It is another object of the present invention to provide a reflex-type sight that is relatively rugged and inexpensive to manufacture.

It is still another object of the present invention to provide a reflex-type sight that provides independent adjustments for height/range and windage.

It is yet another object of the present invention to provide a reflex-type sight that has a variable intensity and replaceable light spot to accommodate various ambient conditions during operation.

It is still further another object of the present invention to provide a reflex-type sight that has unitary body construction and relatively minimum parts.

It is another object of the present invention to provide a reflex-type sight that has all its electrical components self-contained on a circuit board for trouble-free operation, avoiding premature failure of connecting wires due to fatigue in the case where components move relative to each other.

It is still another object of the present to provide a reflex-type sight that provides for wide adjustments for height to account for pronounced trajectories of projectiles such as arrows and the like.

It is an object of the present invention to provide a reflex-type sight that provides for electronic adjustment for height.

It is another object of the present invention to provide a reflex-type sight that provides for convenient two-button control adjustment for height.

It is still another object of the present invention to provide a reflex-type sight that provides an indicator of range responsive to height adjustment.

In summary, the present invention provides a reflex-type sight that can be used in a bow that provides a wide field of view for relatively fast setup, that is relatively rugged and inexpensive to manufacture and provides convenient controls for wide height and windage adjustments for projectiles having high trajectories.

These and other objects of the present invention will become apparent from the following detailed description.

BRIEF DESCRIPTION OF THE DRAWINGS

FIG. 1 is a longitudinal cross-sectional view of a sight in accordance with the present invention.

FIG. 2 is fragmentary cross-sectional of a detail on an alternative windage adjustment mechanism used in the sight of FIG. 1.

FIG. 3 is a front elevational view of the sight of FIG. 1 shown secured to a bow.

DETAILED DESCRIPTION OF THE INVENTION

Figure 4:
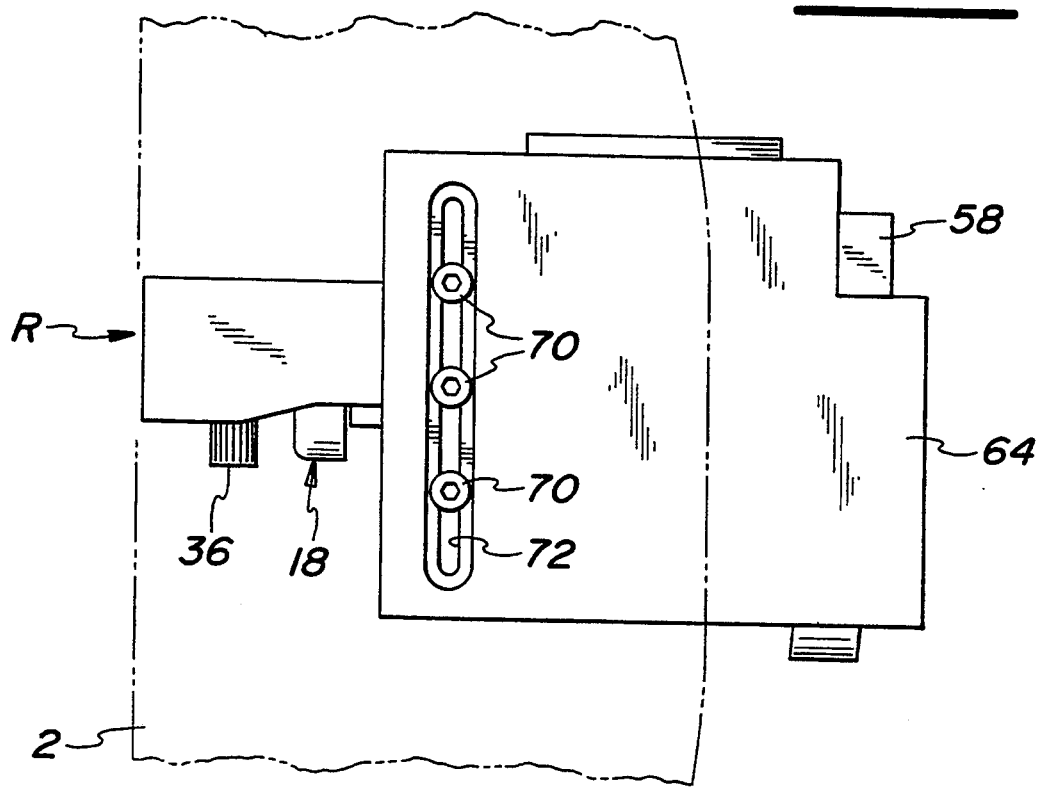
FIG. 4 is a left side fragmentary elevational view taken from FIG. 3, showing a mounting detail of the sight on the bow.

A sight R in accordance with the present invention is disclosed in FIG. 1. The sight R is preferably used with a bow 2 to guide an arrow 4 to its target. The sight R may also be used to guide any projectile which has a pronouncedly high trajectory in its flight to reach its target.

The sight R comprises a unitary frame 6 with a fixed base portion 8 and a hingedly movable portion 10, as best shown in FIG. 1. Resilient hinge portions 12 advantageously connect the base portion 8 to the movable portion 10. The hinge portions 12 advantageously permits the movable portion 8 to move about the horizontal and vertical axes, for height and windage adjustments, respectively, as will become apparent below.

The base portion 8 has a cavity or recess 14 adapted to receive a circuit board 16 carrying a light source 18, a battery 20 and a combination on/off switch and rheostat 22. The electrical components are operably connected together in series through the circuit board 16 such that the rheostat 22 is effective to control the light intensity of the light source 18. Thus, the electrical components are self-contained on the circuit board 16, minimizing relative movements and premature failure of connecting wires due to fatigue. Removable covers 24 and 26 provide access to the battery 20 and the light source 18, respectively. A panel 28 closes the opening to the cavity 14 and secures the circuit board 16 in place.

The light source 18 is connected to the circuit board 16 by means of a plug and socket assembly 30, as best shown in FIG. 1. This advantageously permits the convenient replacement of the light source 18 to provide various options, such as a narrower or wider light spot, different light colors, etc. The light source 18 has a housing 32 with a shoulder 34 that cooperates with the cover 26 such that closure of the cover 26 forces the light source 18 into the circuit board 16, thereby to ensure good contact within the socket and plug 30. The light source 18 can be a light emitting diode passing through an aperture (not shown) on the housing 32 that can be regulated to create different size aiming spots or shapes. The light source 18 may also be a light emitting diode with the light passing through a fiber-optic bundle (not shown) whose size and cross-sectional shape can be varied to change the size and shape of the aiming spot. Further, the light source 18 may be a laser diode projecting on a hologram screen (not shown) on which a photographically incorporated image can be varied to change the size and shape of the aiming spot.

The rheostat 22 has a turning knob 36 projecting outwardly of the base portion 8 to allow the user to turn on/off the light source 18 and to vary its intensity.

The movable portion 10 has an opening 38 in which is secured a lens 40 that reflects a light spot from the light source 18 to the user's eye 41 along the lines 42 and 44 and permits the user to view the target through the lens along line 46 to line up the light spot on the target, as best shown in FIG. 1. The lens 40 has an optical axis 47 that is disposed at an angle with the user's line of sight 46. The lens 40 advantageously includes a laminated inner mirror lens with a capacity to be selectively coated for different wave lengths of light, such as red, green, etc. as desired by the user.

The hinged portion 12 is resilient and advantageously permits the movable portion 10 and thereby the lens 40 to be rotated or twisted about the horizontal and vertical axes. Adjustment about the horizontal axes is accomplished by means of height adjusting screw 48 which is electrically driven by a servo motor assembly 50 as best shown in FIG. 1. Rotation of the screw 48 in one direction will cause the movable portion 10 to move away from the base portion 8 about the hinge portion 12, thereby altering the angle of the lens 40 with respect to the light source 18. Similarly, rotation of the screw 48 in the opposite direction will cause the movable portion 10 to move towards the base portion 8, thereby permitting adjustment of the angle of the lens 40 in the opposite direction. The screw 48 is threadedly secured to a lateral portion 49 of the movable portion 10.

The movable portion 10 may also be adjusted laterally about a vertical axis to change the angle of the lens 40 with respect to the direction or longitudinal axis of the arrow 4 to compensate for the lateral effect of crosswind on the flight of the arrow. This is adjustment is called windage. The windage adjustment may be implemented by providing a slide 52 disposed within a slot 54 in the base portion 8 and a servo motor assembly 55 operably connected to adjusting screw 56 to cause the slide 52 to move laterally within the slot 54. The servo motor assembly 50 and the screw 48 would be carried by the slide 52, as best shown in FIG. 2. Another way for effecting windage adjustment is discussed below.

The sight R is advantageously an open design, without using a telescopic tube, as in the prior art, to provide a wide field of view for the user and permit ease of operation, without requiring the user to precisely peer through a narrow tube to aim, which typically takes up relatively more time.

The sight R is advantageously made from a plastic material, such as DELDRIN, to provide a lightweight apparatus and a relatively resilient frame that advantageously absorbs stresses during use.

The sight R is mounted to the bow 2 by means of a bracket 58 that is secured to the base portion 8 with a pivot screw 60 and a locking screw 62. The bracket 58 is secured to a battery holder 64 with screws 66 through a horizontal slot 68, as best shown in FIG. 3. The battery holder 64 is secured to the bow 2 with screws 70 disposed through a vertical slot 72, as best shown in FIG. 4. The slot 68 allows for lateral adjustment of the sight R with respect to the bow 2 for user preference. The vertical slot 72 advantageously permits vertical adjustment of the sight R with respect to the bow 2.

Figure 5:
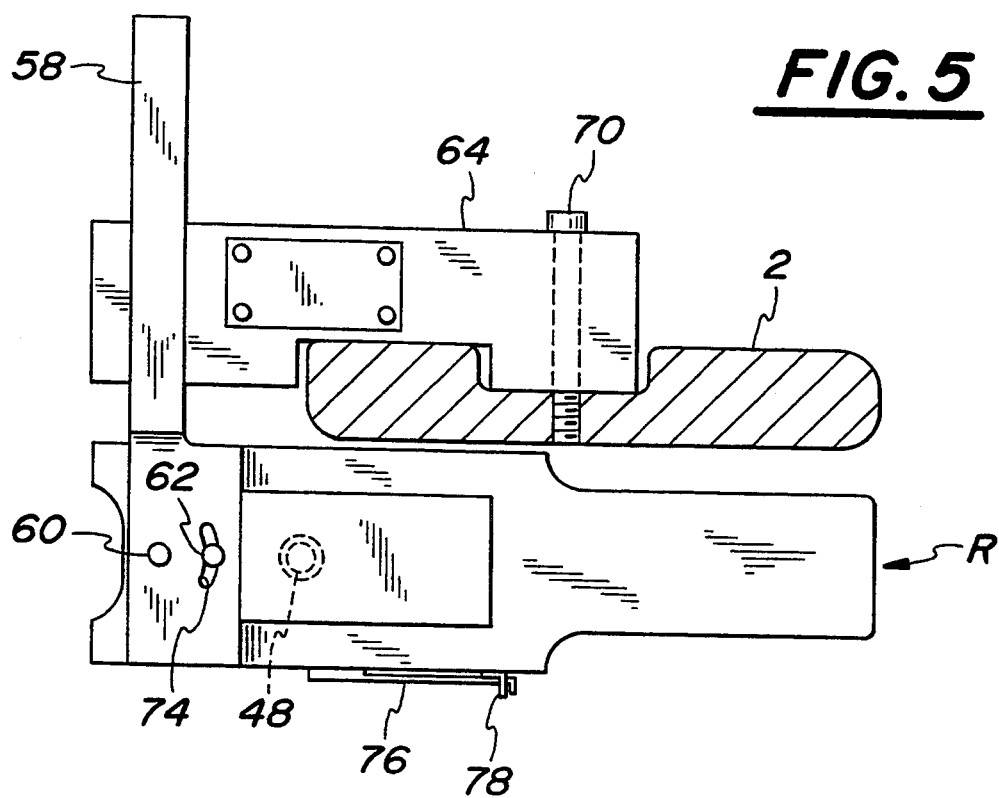
FIG. 5 is a top elevational view of the sight taken from FIG. 3.

The bracket 58 has an arcuate slot 74 which defines a radius about the pivot screw 60, as best shown in FIG. 5. The arcuate slot 74 advantageously permits the sight R to be rotated about the pivot screw 60 to provide windage adjustments.

Figure 6:
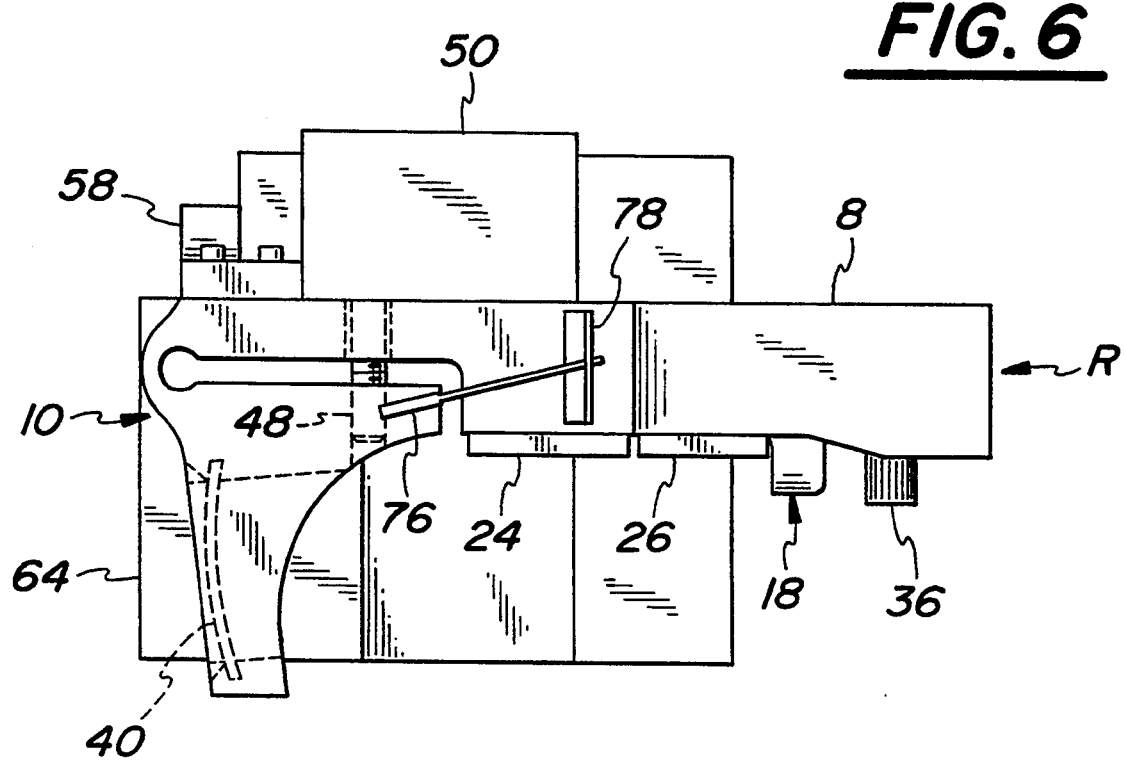
FIG. 6 is a right side elevational view taken from FIG. 3.

A pointer 76 is rigidly secured to the movable portion 10 and cooperates with a scale 78 that is secured to the base portion 8 to advantageously provide an indication to the user on the height adjustment, and therefore range, of the sight R, as best shown in FIG. 6. When the movable portion 10 is rotated about the horizontal axes by the screw 48, the pointer will vertically traverse the scale 78, thereby providing the user data on the amount of adjustment made relative to a reference on the scale. The scale 78 is advantageously visible to the user while in operation to allow selection of the desired range setting while the user is looking through the lens 40. The scale 78 is advantageously illuminated for use in low light settings. The scale 78 may be changed to accommodate different types of projectiles so that the sight R can be accurately calibrated for different distances.

The servo motor assembly 50 is controlled by a pair of elastomeric touch pad switches 80 and 82, as best shown in FIG. 3. The switches 80 and 82 are biased in the open position, similar to the keypad of an electronic calculator. The touch pad 80 is used to cause the movable portion 10 to move upwardly toward the base portion 8 for a target that is located at a relatively longer distance. Similarly, the touch pad switch 82 is used to move the movable portion 10 downwardly away from the base portion 8 for a target located at a relatively shorter distance. The switches 80 and 82 are operably connected to the servo motor assembly 50 to rotate the screw 48 in one or the other direction. The switches 80 and 82 are advantageously carried by a removable strap 84 that is then secured to a convenient position on the bow 2 by means of a standard fastener, such as VELCRO fastener 86, as best shown in FIG. 3. Cables 88 and 90 connect the switches 80 and 82 to the battery housing 64 and the servo motor assembly 50, as best shown in FIG. 3.

Figure 7:
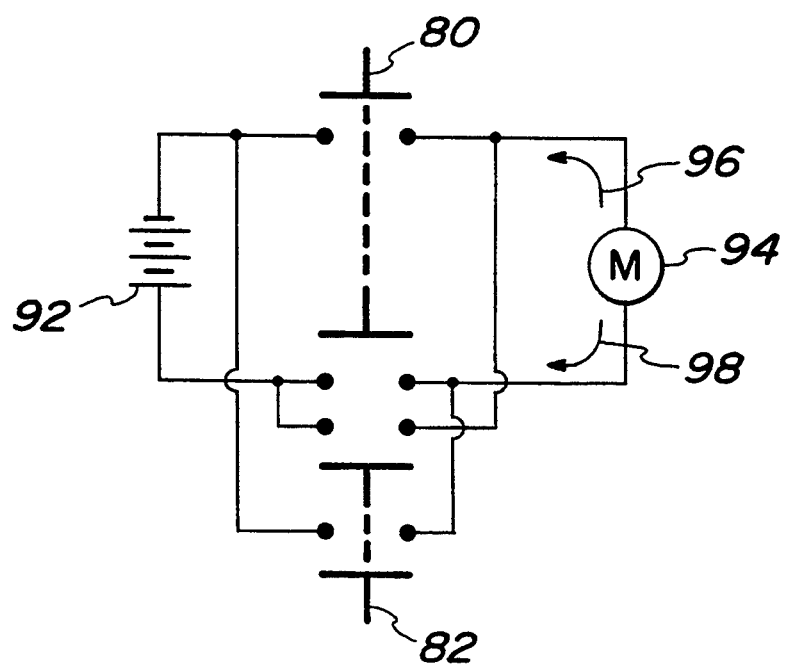
FIG. 7 is a schematic circuit diagram for controlling the operation of the height adjustment servo motor used in the sight of FIG. 1.

The switches 80 and 82 are momentary contact-type such that downward pressure is required to turn the switches on and when pressure is released the switches revert to their normally open position. A schematic circuit diagram showing the interconnection of the switches 80 and 82 with the battery 92 in the battery housing 84 and the motor 94 of the servo motor assembly 50 is disclosed in FIG. 7. When the switch 80 is depressed, the battery 92 is connected across the motor and current flows through the motor in the direction indicated by the arrow 96. When the switch 82 is depressed, the battery 92 is reversed in polarity relative to the motor 94 such that the current flows in the opposite direction as shown by the arrow 98, thereby permitting the motor to rotate in the opposite direction. The motor 94 is DC type such that reversal of polarity of the battery is effective to reverse its rotation. Thus, the user can operate either of the switches 80 and 82 depending on whether it is desired to raise or lower the sight R.

Figure 8B:
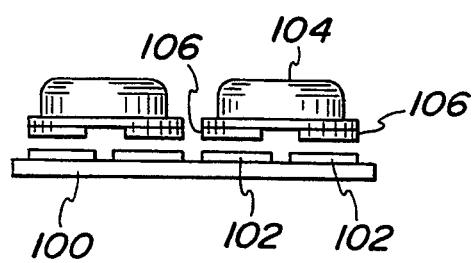
FIGS. 8(a), 8(b) and 8(c) show the detail of the switches used to control the operation of the servo motor.
Figure 8A:
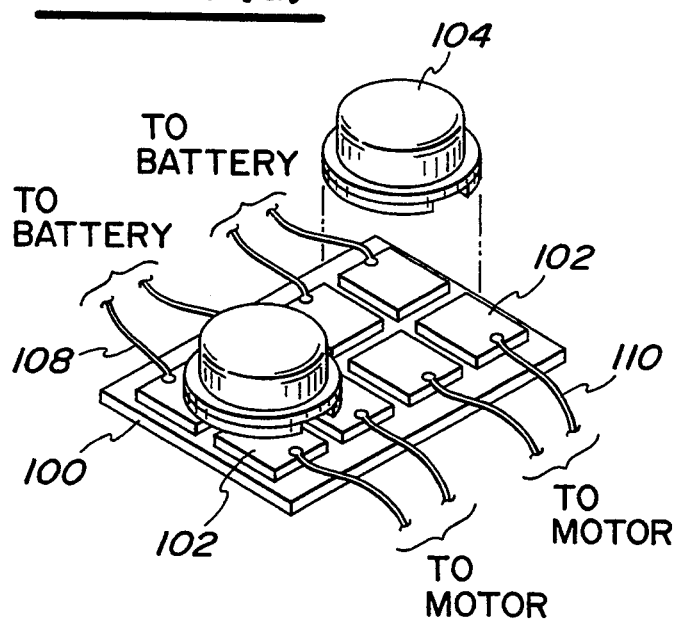
Figure 8C:
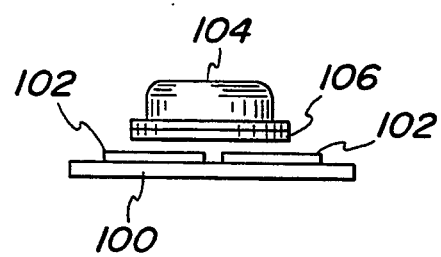
Figure 9:
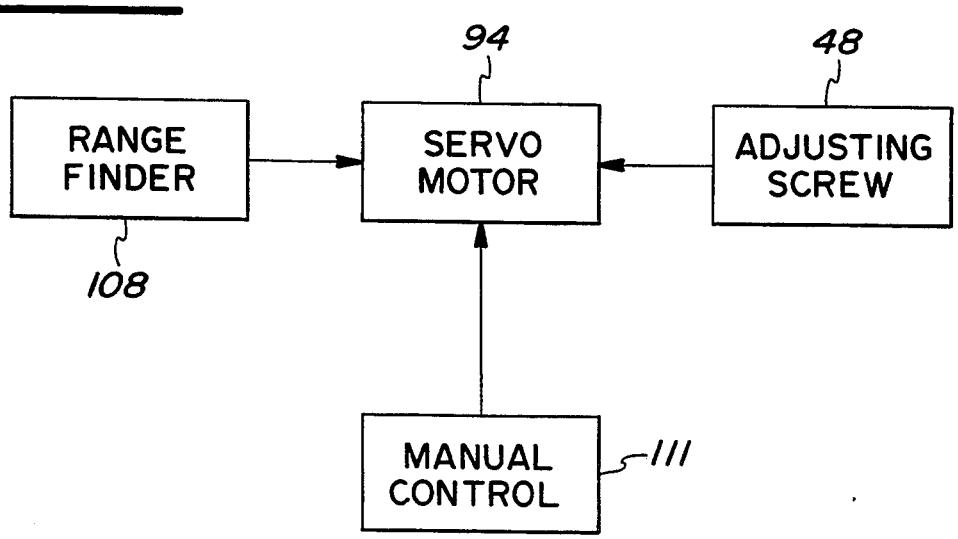
FIG. 9 is a functional block diagram, showing an electronic range finder operably associated with the height adjustment servo motor for automatic height adjustment of the sight of FIG. 1.

The switches 80 and 82 comprise a circuit board 100 supporting 8 rectangular conductive strips 102 that are insulated from each other. A pair of push buttons or key pads 104 are disposed over the conductive strips 102 such that four of the conductive strips 102 are associated with each keypad 104, as best shown in FIG. 8(a). Each of the keypads 104 has a pair of conductive strips 106 on its lower surface such that when the keypad is depressed, the underlying conductive strips 106 are effective to jumper or connect the respective pair of adjacent conductive strips 102. Wires 108 and 110 from the battery 92 and the motor 94, respectively, are connected to the conductive strips 102, as best shown in FIG. 8(a).

Limit switches (not shown) associated with the movable portion 10 are adapted to stop the motor 94 at each end of its travel such that the amount of movement of the movable portion 10 is limited. The travel of the adjusting screw 48 may also be limited by stalling the servo motor 94 with a gear reduction system (not shown).

A range finder 108 of standard construction may be hooked up with the servo motor 94 to control the rotation of the adjusting screw 48. The range finder 108 will therefore advantageously provide for automatic height adjustment for the sight R. Manual controls 110, such as the switches 80 and 82, would provide for manual height adjustment, if desired, when the range finder 108 is in the off position. The range finder 108 may be infrared type. The range finder 108 is calibrated with the servo motor assembly 94 such that the lens 40 is rotated to height adjustment in response to the distance reading made by the range finder 108 to the target. The range finder 108 may be incorporated with the battery housing 64 or the servo motor assembly 50.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A sight for aiming an arrow propelled by a bow to a target, comprising:
   a) a frame having a front end and a rear end;
   b) a mounting support secured to said frame for attaching said frame to a bow;
   c) a ring secured to said frame front end;
   d) a lens secured in said ring, said lens having an optical axis disposed at an angle relative to a user's line of sight through said lens and the target;
   e) a light source secured to said frame rear end and adapted to project a light spot onto said lens;
   f) said light source and said lens being positioned relative to each other such that the light spot projected onto said lens is reflected to the user's eye who then lines up the light spot onto the target to take aim;
   g) a hinge disposed between said ring and said frame;
   h) a screw-drive operably associated with said ring and said frame and adapted to selectively move said ring about said hinge in first and second opposite directions to change the orientation of the optical axis of said lens relative to the user's line of sight, thereby causing the user to change the attitude of the arrow relative to the horizontal to compensate for various distances to the target; and
   i) first and second switches adapted to control the operation of said screw-drive in moving said ring in said first and second opposite directions, respectively.

2. A sight as in claim 1, wherein:
   a) said hinge is integral with said frame and said ring.

3. A sight as in claim 1, wherein:
   a) said hinge is resilient.

4. A sight as in claim 1, wherein:
   a) said ring includes a base portion disposed a distance from said hinge; and
   b) said screw-drive includes a screw threadedly secured to said base portion such that rotation of said screw causes said base portion to move relative to said frame about said hinge.

5. A sight assembly as in claim 1, and further comprising:
   a) an indicator for the position of said lens relative to a reference position.

6. A sight as in claim 5, wherein:
   a) said indicator includes a pointer secured to said ring and movable therewith; and
   b) a scale secured to said frame and operably associated with said pointer such when said ring is moved, said pointer will move along said scale to indicate change of position relative to the reference position.

7. A sight as in claim 6, wherein:
   a) said scale is removable.

8. A sight as in claim 1, wherein:
   a) said light source is a light emitting diode.

9. A sight as in claim 1, wherein:
   a) said light source is removable.

10. A sight assembly as in claim 1, and further comprising:
    a) a battery and a switch operably connected to said light source.

11. A sight as in claim 10, and further comprising:
    a) a circuit board disposed in said frame; and
    b) said light source, battery and switch are disposed on said circuit board.

12. A sight as in claim 10, wherein:
    a) said light source includes a light emitting diode;
    b) said light source, battery and switch are connected in series and disposed on a circuit board; and
    c) said circuit board is disposed in a recess in said frame.

13. A sight assembly as in claim 11, wherein:
    a) said light source includes a plug; and
    b) said circuit board includes a socket adapted to receive said plug.

14. A sight as in claim 10, wherein:
    a) said switch includes a rheostat.

15. A sight as in claim 1, wherein:

a) said mounting support is adjustable vertically and laterally, thereby to permit said frame to be selectively positioned laterally and vertically of the bow.

16. A sight as in claim 1, wherein:
a) said frame is pivotably adjustable relative to said mounting support, thereby to permit the user's line of sight to the target to be disposed at an angle to the axis of the arrow to compensate for the effect of crosswind to the trajectory of the arrow.

17. A sight as in claim 1, wherein:
a) said first and second switches are disposed on a removable strap for securing to a portion of the bow.

18. A sight as in claim 1, wherein:
a) said first and second switches are biased in the open position.

19. A sight as in claim 1, wherein:
a) said first and second switches comprise first and second elastomeric pads, each having a pair of conductive strips adapted to connect two pairs of poles at the same time.

20. A sight as in claim 19, wherein:
a) said first switch is adapted for connecting a power source to said screw-drive at one polarity such that said screw-drive operates in said first direction; and
b) said second switch is adapted for connecting the power source to said screw-drive at a reverse polarity such that said screw-drive operates in said second direction.

21. A sight assembly as in claim 1, and further comprising:
a) a range finder operably connected to said screw-drive; and
b) said screw-drive being adapted to move said ring in response to the distance to the target measured by said range finder.

22. A sight for aiming an arrow propelled by a bow to a target, comprising:
a) a unitary frame having a base portion and a movable portion;
b) a mounting support secured to said base portion for attaching said frame to a bow;
c) a lens secured in a lens holder to said movable portion, said lens having an optical axis disposed at an angle relative to a user's line of sight through said lens and the target;
d) a light source secured to said base portion and adapted to project a light spot onto said lens;
e) said light source and said lens being positioned relative to each other such that the light spot projected onto said lens is reflected to the user's eye who then lines up the light spot onto the target to take aim;
f) a resilient portion disposed between said movable portion and said base portion;
g) a screw-drive operably associated with said movable portion and said base portion and adapted to selectively move said lens holder about said resilient portion in first and second opposite directions to change the orientation of the optical axis of said lens relative to the user's line of sight, thereby causing the user to change the attitude of the arrow relative to the horizontal to compensate for various distances to the target;
h) an indicator responsive to the movement of said lens holder relative to a reference position and adapted to indicate the distance to the target; and
i) first and second switches adapted to control the operation of said screw-drive in moving said lens holder in said first and second opposite directions, respectively.

23. A sight as in claim 22, wherein:
a) said indicator includes a pointer secured to said lens holder and movable therewith; and
b) a scale secured to said base portion and operably associated with said pointer such when said lens holder is moved, said pointer will move along said scale to indicate change of position relative to the reference position.

24. A sight as in claim 23, wherein:
a) said scale is removable.

* * * * *